United States Patent
O'Broin et al.

(10) Patent No.: US 9,940,023 B2
(45) Date of Patent: *Apr. 10, 2018

(54) SYSTEM AND METHOD FOR AN ACCELERATOR CACHE AND PHYSICAL STORAGE TIER

(71) Applicant: Drobo, Inc., San Jose, CA (US)

(72) Inventors: Jason P. O'Broin, San Francisco, CA (US); Rodney G. Harrison, London (GB); Terence M. Rokop, Aloha, OR (US)

(73) Assignee: Drobo, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/200,456

(22) Filed: Jul. 1, 2016

(65) Prior Publication Data

US 2016/0313920 A1    Oct. 27, 2016

Related U.S. Application Data

(63) Continuation of application No. 13/798,911, filed on Mar. 13, 2013, now Pat. No. 9,411,736.

(51) Int. Cl.
*G06F 3/06* (2006.01)
*G06F 12/0866* (2016.01)
(Continued)

(52) U.S. Cl.
CPC .............. *G06F 3/0604* (2013.01); *G06F 3/06* (2013.01); *G06F 3/061* (2013.01); *G06F 3/0631* (2013.01); *G06F 3/0656* (2013.01); *G06F 3/0679* (2013.01); *G06F 3/0685* (2013.01); *G06F 12/0246* (2013.01); *G06F 12/0866* (2013.01);
(Continued)

(58) Field of Classification Search
CPC .................................................... G06F 3/0656
See application file for complete search history.

(56) References Cited

U.S. PATENT DOCUMENTS 7,814,272 B2    10/2010    Barrall et al.
7,814,273 B2    10/2010    Barrall
(Continued)

OTHER PUBLICATIONS

Adaptec by PMC, *Reduce Latency and Increase Application Performance Up to 44x with Adaptec maxCache™ 3.0 SSD Read and Write Caching Solutions*, MaxCache 3.0 Whitepaper, PMC—Sierra, Inc., available at http://www.adaptec.com/en-us/solutions/maxcache/, 2013, 5 pages.
(Continued)

*Primary Examiner* — Edward J Dudek, Jr.
(74) *Attorney, Agent, or Firm* — Sunstein Kann Murphy & Timbers LLP

(57) ABSTRACT

The storage processor of a data storage system such as a storage array automatically uses a first portion of an accelerator cache storage device for an accelerator cache and a second portion of the accelerator cache storage device for a physical storage tier upon detecting the presence of the accelerator cache storage device installed in the data storage system, such as when a storage device is plugged into a designated slot of the data storage system, without requiring any user configuration of the accelerator cache or physical storage tier and without specification by the user of the type(s) of data to be cached in the accelerator cache or stored in the physical storage tier.

20 Claims, 9 Drawing Sheets

(51) Int. Cl.
  *G06F 12/02* (2006.01)
  *G06F 12/0871* (2016.01)
  *G06F 12/0873* (2016.01)

(52) U.S. Cl.
  CPC ...... *G06F 12/0871* (2013.01); *G06F 12/0873* (2013.01); *G06F 2212/214* (2013.01); *G06F 2212/281* (2013.01); *G06F 2212/305* (2013.01); *G06F 2212/313* (2013.01); *G06F 2212/604* (2013.01); *G06F 2212/7202* (2013.01)

(56) References Cited

U.S. PATENT DOCUMENTS

| | | | |
|---|---|---|---|
| 7,818,531 | B2 | 10/2010 | Barrall |
| 7,873,782 | B2 | 1/2011 | Terry et al. |
| 9,411,736 | B2 * | 8/2016 | O'Broin et al. ........ G06F 3/061 |
| 2006/0174157 | A1 | 8/2006 | Barrall et al. |
| 2006/0253650 | A1 * | 11/2006 | Forrer, Jr. ........... G06F 12/0866 711/113 |
| 2009/0210620 | A1 | 8/2009 | Jibbe et al. |
| 2009/0282194 | A1 | 11/2009 | Nagashima |
| 2011/0113194 | A1 | 5/2011 | Terry et al. |
| 2011/0320733 | A1 | 12/2011 | Sanford et al. |
| 2012/0198152 | A1 | 8/2012 | Terry et al. |
| 2012/0210058 | A1 | 8/2012 | Mittendorff et al. |
| 2013/0198456 | A1 | 8/2013 | Harrison et al. |
| 2014/0019680 | A1 * | 1/2014 | Jin .................. G11B 5/012 711/112 |
| 2014/0068182 | A1 | 3/2014 | Terry |

OTHER PUBLICATIONS

Bestofmedia Team, *LAN 101: Networking Basics*, tom's Hardware, Sep. 14, 2011, 15 pages.

Kgil et al., *Improving NAND Flash Based Disk Caches*, In: 35th International Symposium on Computer Architecture (ISCA), Beijing, IEEE, Jun. 21, 2008, pp. 327-338.

Microsoft, *Understand ReadyBoost and whether it will Speed Up your System*, Microsoft, TechNet Magazine, available at https://technet.microsoft.com/en-us/magazine/ff356869.aspx, 2 pages, undated.

Saxena et al., *FlashTier: a Lightweight, Consistent and Durable Storage Cache*, EuroSys '12, Proceedings of the 7$^{th}$ ACM European Conference on Computer Systems, Bern, Switzerland, Apr. 10-13, 2012, 14 pages.

Synology Inc., *Using Synology SSD Technology to Enhance System Performance*, Synology Inc., White Paper, Dec. 11, 2012, 12 pages.

International Searching Authority, International Search Report—International Application No. PCT/US2014/023034, dated Jul. 9, 2014, together with the Written Opinion of the International Searching Authority, 9 pages.

* cited by examiner

SYSTEM AND METHOD FOR AN ACCELERATOR CACHE AND PHYSICAL STORAGE TIER

CROSS-REFERENCE TO RELATED APPLICATION(S)

This patent application is a continuation of, and therefore claims priority from, U.S. patent application Ser. No. 13/798,911 entitled SYSTEM AND METHOD FOR AN ACCELERATOR CACHE BASED ON MEMORY AVAILABILITY AND USAGE filed on Mar. 13, 2013 (now U.S. Pat. No. 9,411,736), which is hereby incorporated herein by reference in its entirety.

The subject matter of this patent application also may be related to one or more of the following patent applications:

U.S. patent application Ser. No. 13/363,740 entitled SYSTEM, APPARATUS, AND METHOD SUPPORTING ASYMMETRICAL BLOCK-LEVEL REDUNDANT STORAGE filed on Feb. 1, 2012, (ABANDONED);

U.S. patent application Ser. No. 13/777,107 entitled Storage Virtualization In A Block-Level Storage System filed on Feb. 26, 2013, (ABANDONED); and U.S. patent application Ser. No. 13/790,163 entitled Fast Cache Reheat filed on Mar. 8, 2013.

Each of these patent applications is hereby incorporated herein by reference in its entirety.

FIELD OF THE INVENTION

The present invention relates generally to data storage systems and more specifically to automatic management of an accelerator cache in a data storage system.

BACKGROUND OF THE INVENTION

A cache is commonly used in a computer system to provide fast access to part of a dataset. Typically a cache memory is significantly faster than the main data store, often by more than an order of magnitude. Cache memories are usually quite small relative to a larger data store from which their contents are obtained. For example, a CPU may have a cache of 2 MiB used to accelerate access to 16 GiB of DRAM, or a 4 TiB hard disk may have 64 MiB of DRAM as its cache.

Because of the large disparity in the size of a typical cache and the dataset being accelerated the choice of which data to cache, and when, is critical. Equally critical is the choice of which data to evict from a cache and when such an eviction should take place.

A computer system may have several levels of cache, perhaps of differing speed and size, and also may have several types of cache. Caches may be generic and able to hold any data in the system, e.g. a processor L2 cache, and some caches may be specialised and able to only hold very specific types of data, e.g. a processors translation lookaside buffer used to hold only address translation tables.

Caches may be built from special hardware, e.g. processor L2 and TLB caches or caches may be ordinary DRAM used to accelerate access to data normally held on a slower medium, e.g. a magnetic disk.

Some caches may hold data that are expected to cycle through very quickly, e.g. a processor L2 cache and some hold data that may stay in cache for a long time, e.g. some page address translations in a TLB.

Those data frequently accessed so as to be held in a cache are often referred to as a "hot set" or "hot data". As the set of hot data changes the data in the cache will be accessed less frequently and the data in the main store will be accessed more frequently. This can be viewed as a cooling of the temperature of the data in the cache and is a sign that some data must be evicted from the cache in order to make way for new, hotter, data to be cached.

SUMMARY OF EXEMPLARY EMBODIMENTS

In one embodiment there is provided a method of managing an accelerator cache in a data storage system. The method involves detecting presence of an accelerator cache storage device in the data storage system and automatically configuring an accelerator cache using a portion of the storage space of the storage device.

In another embodiment there is provided a data storage system comprising a storage processor and at least one storage slot allowing insertion of an accelerator cache storage device, wherein the storage processor is configured to detect presence of an accelerator cache storage device in the data storage system and automatically configuring an accelerator cache using a portion of the storage space of the storage device.

In various alternative embodiments, the presence of the accelerator cache storage device may be detected during at least one of a system restart or installation of the storage device into the data storage system and may be detected in a dedicated slot of the data storage system or in a general-purpose slot of the data storage system. Automatically configuring an accelerator cache using at least a portion of the storage space of the storage device may involve determining that no accelerator cache exists in the system, determining the portion of the storage space of the storage device to use for the accelerator cache, and creating the accelerator cache. Alternatively, automatically configuring an accelerator cache using at least a portion of the storage space of the storage device may involve determining that an accelerator cache already exists in the data storage system, determining the portion of the storage space of the storage device to use for the accelerator cache, and concatenating the portion onto the existing accelerator cache.

The accelerator cache may be populated based on data stored in a primary storage system. For example, the data stored in the primary storage system may be stored redundantly, and the accelerator cache may be used for non-redundant caching of the data. The accelerator cache may be populated with data from a transactional storage tier of the primary storage system, e.g., based on a transactional tier prefer-retain least-recently used list, or from transactional reads that are unable to be satisfied from the AC, i.e. an Accelerator Cache miss.

Upon detecting removal of the storage device from the data storage system, the accelerator cache may be automatically disabled, if the removed storage device was the last storage device associated with the accelerator cache, or the remaining accelerator cache storage may continue to be used without reinitialization of the remaining accelerator cache storage, if the storage device was not the last storage device associated with the accelerator cache.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
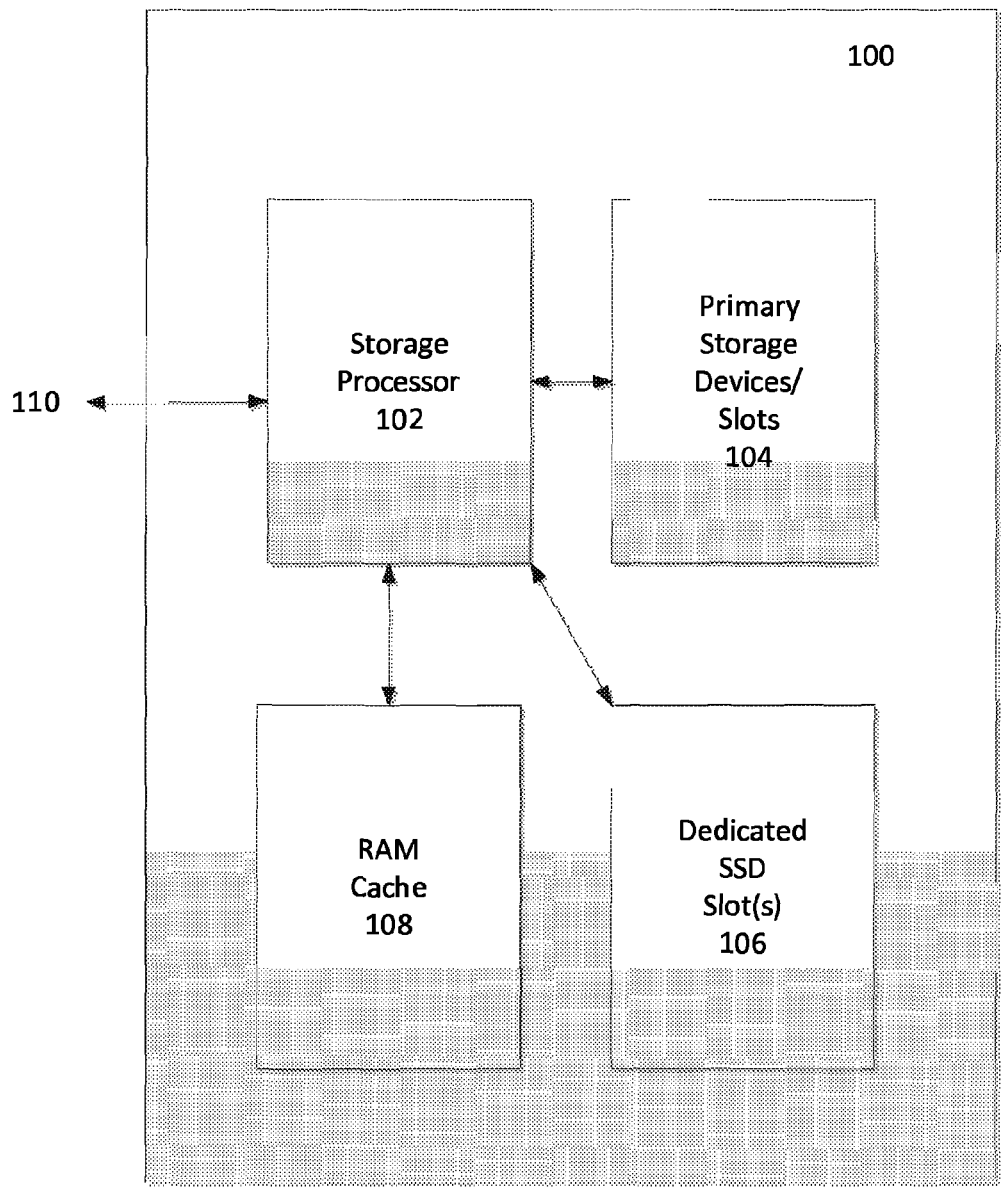
FIG. 1 is a schematic block diagram of a data storage system in accordance with one exemplary embodiment of the present invention.

In embodiments of the present invention, the storage processor of a data storage system such as a storage array automatically configures one or more accelerator caches ("AC") upon detecting the presence of one or more appropriate storage devices (e.g., solid-state storage devices such as SSD drives, USB drives; storage devices containing ReRAM or memristor storage, etc.) installed in the data storage system, such as when a storage device is plugged into a designated slot of the data storage system, without requiring any user configuration of the AC or specification by the user of the type(s) of data to be cached in the AC. The AC therefore provides a zero configuration cache that can be used to cache any of various types of data in the data storage system. For example, the storage processor can use the AC to provide what is effectively a layer-2 (L2) cache behind an existing L1 RAM cache. The AC cache can be used in any of a wide variety of data storage systems including, without limitation, file servers, storage arrays, computers, etc. Multiple ACs may be created to cache different types of data.

Glossary

The following terms and concepts are used to describe various exemplary embodiments below:

An "AC storage device" (often referred to simply as a "storage device," and in specific exemplary embodiments configured to use one or more SSD drives for an accelerator cache, as an "SSD") is a persistent storage device with a suitable level of random access performance that is appropriate for an accelerator cache, as discussed herein. Without limitation, examples of AC storage devices include solid-state storage devices such as SSD drives and USB drives, and storage devices containing ReRAM or memristor storage.

AC ("Accelerator Cache"): A cache formed automatically from storage space of one or more AC storage devices when such storage devices are detected in the data storage system. A data storage system may form one or more AC caches, e.g., to cache different types of data.

AC user data: The data being cached by the AC, which in an exemplary embodiment are peers of redundant data stored in a primary storage system.

AC page: A unit of both virtual and physical addressing in the AC, analogous to an L2 cache line. In an exemplary embodiment, writes to the AC will be done in multiples of the AC pagesize, which may be any suitable size that is a multiple of the SSD blocksize (e.g., 2 MiB).

Physical AC page: An AC-pagesize-sized-and-aligned chunk of storage available for AC user data on a logical disk designated as part of a AC.

Virtual AC page: An AC-pagesize-sized-and-aligned chunk of virtual address space.

Bitmap group: A number of low-level bitmap bits that are tracked using a higher-level bitmap bit indicating whether any of those low-level bits are free, for the purposes of speeding up allocations when not many bits are free in the whole AC.

Sector: The minimum size in terms of which storage in the primary storage is addressed. In an exemplary embodiment, other units of storage are multiples of the sector size.

blocksize: The minimum size that can be written to a storage device without having to do a read-modify-write cycle. This varies by storage device. In an exemplary embodiment, the AC pagesize and page table page size are multiples of the blocksize of any supported AC storage device.

Page table page: A chunk of a fixed number of page table entries. This should be a multiple of any blocksize.

Page directory page: A page table page whose entries point to further page tables (instead of directly to AC physical pages).

Exemplary Data Storage Systems

FIG. 1 is a schematic block diagram of a data storage system 100 in accordance with one exemplary embodiment of the present invention. Among other things, the data storage system 100 includes a storage processor 102 and primary storage devices/slots 104, and optionally includes a RAM cache 108 and/or one or more dedicated slots 106 in which storage devices appropriate for AC storage may be installed (e.g., SSD drives, USB drives, etc.). Storage device(s) that can be used for the AC can be installed in dedicated slot(s) 106, primary storage slot(s) 104, or a combination of both. The storage processor 102 interfaces with a storage client 110 through a communication interface, such as a Thunderbolt interface, USB interface, SCSI interface, TCP/IP interface, or other communication interface.

The storage processor automatically identifies suitable storage devices, decides how much space from each storage device to use for the AC, and configures that storage in to a single cache. The storage processor automatically configures the AC from portion(s), up to and including the entire storage space, of one or more storage devices into a single coherent cache, and therefore the AC may be comprised of storage space from a single storage device (including a portion or even non-contiguous portions of the storage space from a single storage device) or storage space from multiple storage devices. The storage processor can automatically expand the AC upon detecting the presence of additional storage device(s) to linearly increase the amount of available cache space.

If a storage device used as part of the AC fails or is removed from the data storage system, the storage processor continues using any remaining AC storage as-is without having to "reheat" that remaining AC storage. Thus, when multiple storage devices are used for the AC, in whole or in part, if one of the devices fails or is removed, only that part of the AC located on the missing device is discarded, while data in any remaining AC storage are retained as part of the cache and still function normally as a coherent single cache. Unlike some other types of plug-in caches that require exclusive access to the entire storage space of the storage device for use as a cache, the storage processor of exemplary embodiments can use only part of the storage space of a storage device for AC storage and can use the remaining part of the storage device for other type(s) of storage (e.g., to form a transactional storage tier as discussed in U.S. patent application Ser. No. 13/363,740). The AC effectively can be disabled by removal of all of the storage devices used for AC storage. Additionally, the storage processor may automatically disable all or a portion of the AC under certain circumstances, such as if the storage processor determines that some or all of the AC storage space is needed for storage for other data (e.g., such as to maintain redundant storage of user data when other storage resources are not available).

Because the SSD storage is persistent, the contents of the AC cache are persistent. Metadata for the AC cache may be stored in the primary storage device(s) so that the AC can continue to function after a system restart or if a storage device is removed and subsequently re-inserted back into the system.

Use of SSD(s) as storage devices for an AC is one exemplary embodiment and not a requirement of the invention. Any storage device with suitable persistence and random access performance may be used, e.g. a storage device built using ReRam or Memristor technology.

Figure 2:
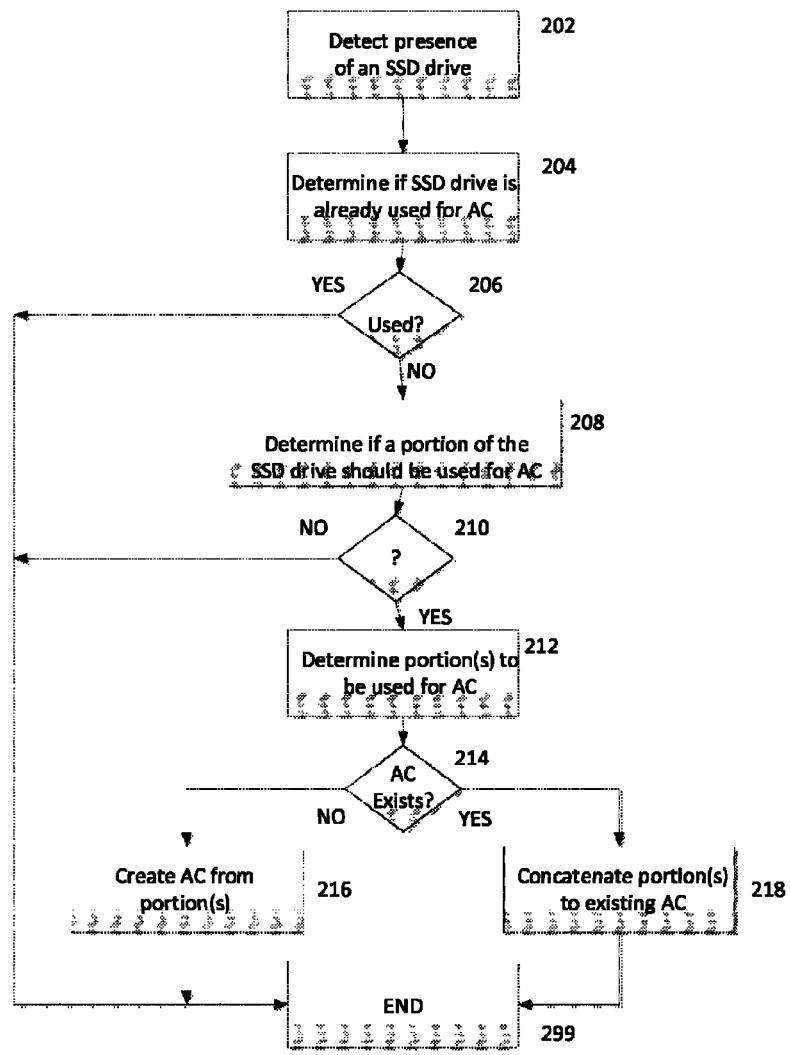
FIG. 2 is a logic flow diagram for management of an accelerator cache, in accordance with one exemplary embodiment.

FIG. 2 is a logic flow diagram for management of an accelerator cache, in accordance with one exemplary embodiment. In block 202, the storage processor detects the presence of an SSD drive, such as when the SSD drive is inserted into a running system or following a system restart. In block 204, the storage processor determines if the SSD drive is already used for an AC, e.g., based on AC metadata stored in the primary storage device(s). If so (YES in block 206), then the storage processor continues using the SSD drive for AC, and the logic terminates in block 299. If the SSD drive is not already used for AC (NO in block 206), then the storage processor determines if a portion of the SSD drive should be used for AC based on predetermined criteria (e.g., the amount of primary storage needed, the types of storage accesses, etc.), in block 208. If no portion is to be used for AC (NO in block 210), then the logic terminates in block 299. If a portion is to be used for AC (YES in block 210), then the storage processor determines the portion(s) to be used for AC, in block 212. As discussed above, the storage processor may use some or all of the storage space of the SSD drive for AC. If there is no existing AC (NO in block 214), then the storage processor creates the AC from the portion(s), in block 216, and the logic terminates in block 299. If the AC already exists, then the storage processor concatenates the portion(s) to the existing AC, in block 218, and the logic terminates in block 299. The logic can be repeated for any number of SSD drives installed in the system, for example, at system startup and/or on an ongoing basis.

An exemplary embodiment is now described with reference to certain data storage systems known as the Drobo™ data storage appliance sold by Drobo, Inc. of San Jose, Calif. Certain features of the appliance are described with reference to U.S. Pat. No. 7,814,273, U.S. Pat. No. 7,814,272, U.S. Publication No. 2006/0174157 (e.g., redundant storage); U.S. Pat. No. 7,818,531 (e.g., status indicators); U.S. Pat. No. 7,873,782 (filesystem-aware functionality); U.S. Publication No. 2012/0198152) and U.S. patent application Ser. No. 13/777,107) (e.g., block-level storage tiering); and U.S. patent application Ser. No. 13/790,163 (e.g., fast cache reheat). Each of these patents and patent applications is hereby incorporated herein by reference in its entirety.

The appliance includes a dedicated slot that can accept an industry standard mSATA form factor SSD drive, and the storage manager will decide if and when to use storage space from an SSD drive installed in this slot for the AC. The use of a dedicated slot for installing an SSD drive to add storage for an accelerator cache may be applied to other types of data storage systems, such as RAID arrays, NAS devices, etc. Additionally or alternatively, the storage processor may use portions of one or more SSD drives installed in the slots used for primary storage (e.g., slots normally used to install hard disk drives) for the AC. In certain exemplary embodiments, storage space from an SSD drive installed in a dedicated slot may be aggregated with storage space from one or more SSD drives installed in slots used for primary, redundant storage for the AC.

In certain exemplary embodiments, the AC may be used as a non-redundant read cache between one or more RAM caches (e.g., an HLBAT cache) and the primary storage, similar to an L2 cache, such as to accelerate reads of data with access patterns like those of thumbnail databases or home directory metadata for users who keep their home directories on the appliance. Furthermore, the AC may be used in combination with physical block-level tiering, since the AC can accelerate reads from a greater volume of storage per unit of SSD devoted to it than a physical tier can (because a physical tier must be redundant), and with lower latencies (because it operates at a higher level of the stack), but a physical tier can accelerate writes, which the AC cannot (because it is not redundant). The data cached in the AC will also be stored redundantly on the primary storage devices. However, storage space used for the AC is not redundant and will not be part of any redundancy group, and its space will not be considered part of any existing storage pools (bulk or fast). Rather, the AC storage space will be logically divided into regions, but its regions will not be placed in zones; thus, the AC module will interface with a region manager of the storage processor as opposed to a zone manager of the storage processor. Where only a portion of an SSD drive (whether installed in the bottom mSATA slot or installed in one of the primary storage slots) is used for the AC, the remaining regions of the storage device will be available for use in zones, e.g., to provide redundant storage.

Thus, when used in this context, no AC storage is lost to overhead for redundancy because the AC is purely a cache, so when multiple portions of storage space are aggregated to form the AC, the total AC storage is the sum of all the parts. Also, since data in the AC are copies of data held on the redundant storage in the storage array, abrupt removal of the cache is supported with no further need for recovery by the system.

AC Module

The storage processor includes an AC module that is logically inserted into the storage processor stack at the point where a read miss on a RAM cache (e.g., L1 cache) is processed by a cache manager of the storage processor. Generally speaking, the AC module may be called any time there is a read miss (e.g., through an existing cache miss handler) or may be called only for certain types of read misses. In this exemplary embodiment, population and maintenance of the data cached in AC are handled outside of the I/O latency path rather than a cache miss (or number of misses) causing a cache load. The high-volume on-disk structures used to track and index the AC will be on the same logical disk(s) as the AC user data. Both for performance and simplicity of error recovery, structures in the redundant disks will not refer to structures in the AC, other than to keep track of the SSD drive as a member in the disk pack.

Thus, in this exemplary embodiment, the cache manager will not automatically check the AC when a read misses in the RAM L1 cache, nor will it automatically populate the cache with writes. Instead, the AC will provide interfaces with which to look up, read, invalidate, and populate sections of the cache, and clients will decide when and where to call them, generally treating the AC as an optional peer of the redundant data being cached.

In one exemplary embodiment, AC data are populated based on CAT records that were loaded on behalf of a transactional I/O and that are long lived in their own cache (ZMDT). Thus, in this exemplary embodiment, the only data that will use the AC will be host data, for which the L1 cache is the HLBAT cache, so a host LBA tracker of the storage processor effectively will be the client of the AC module. A background task that scans the ZMDT "prefer-retain" list will populate (put new data into) the AC based on heuristics, and the population will also drive eviction (the removal of pages from the AC). In an alternative exemplary embodiment, the AC may track reads that are unable to be satisfied from the AC, i.e. AC misses, and build those into a database to be used to populate the AC at a later time. The AC may be configured to populate itself in such a manner based on a single miss per AC page or a number of misses per AC page. The number of misses before such population occurs may be pre-configured or dynamically computed by the AC module based on heuristics that determine the effectiveness of the current policy.

AC data will be loaded a whole cache page at a time and those pages are aligned in the host LBA space on page boundaries, e.g. 2 MiB of data are loaded into AC at a time from addresses on 2 MiB boundaries. However, once loaded, if those data are changed, they can be directly updated in place with I/O smaller than a page (e.g., by a storage processor module that writes dirtied HLBA ranges from an existing RAM L1 cache to primary storage, which now will also perform an AC overwrite to ensure that an AC-cached data are kept up to date). In other words, data are loaded, and evicted, from AC in pages but updated piecemeal. In this exemplary embodiment, it is optional to populate the AC with new data, but it is mandatory to overwrite (or invalidate) it when data it may be caching are changed, to prevent future reads from finding stale data in it. The AC reuses the client's locks on the L1-cached data to ensure the coherency of its user data (though it locks its metadata internally), both for simplicity and to minimize overhead.

Figure 3:
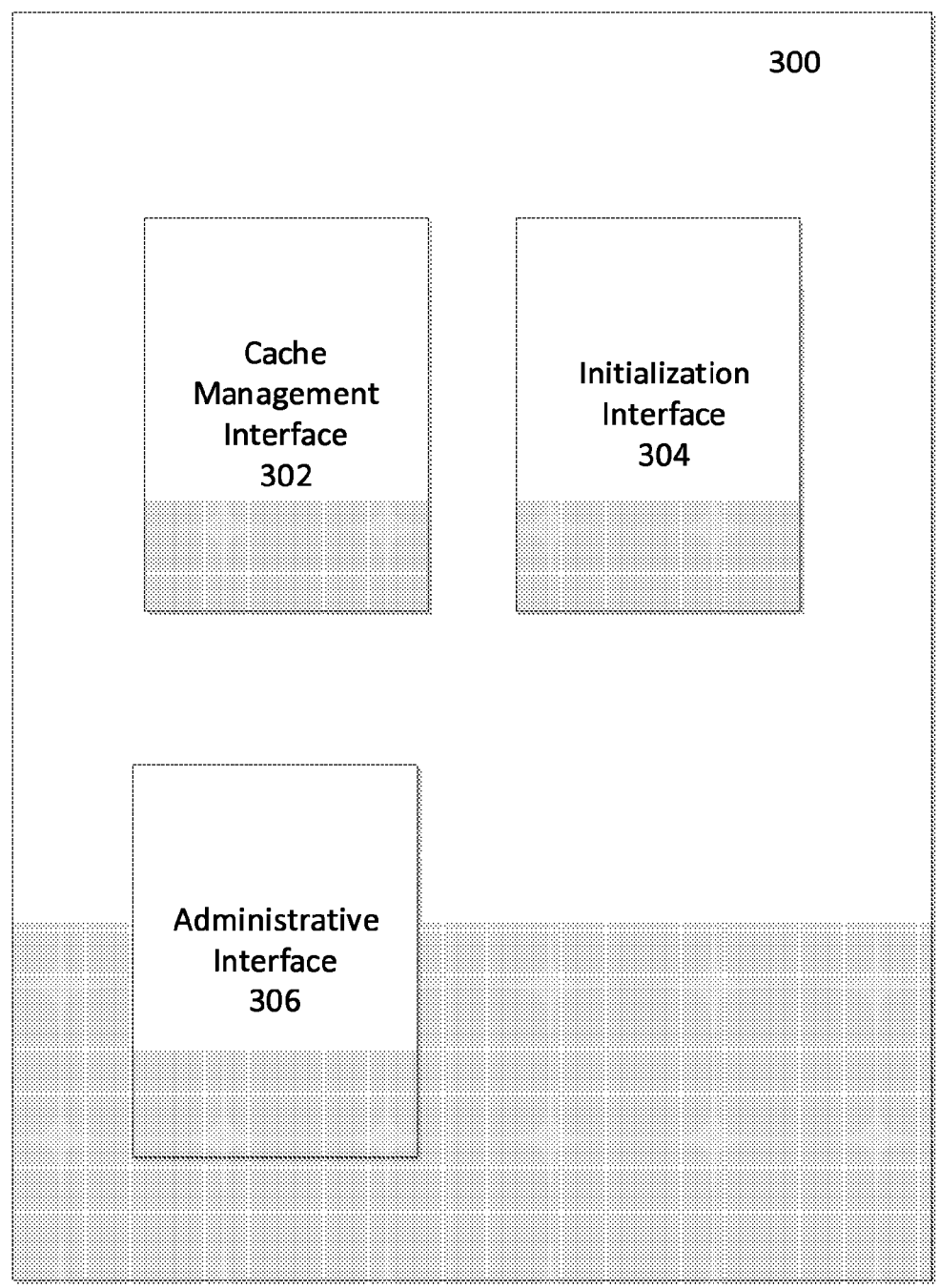
FIG. 3 is a schematic block diagram of the interfaces provided by the AC module, in accordance with one exemplary embodiment.

FIG. 3 is a schematic block diagram of the interfaces provided by the AC module 300, in accordance with one exemplary embodiment. The AC module 300 includes a cache management interface 302, an initialization interface 304, and an administrative interface 306.

The cache management interface 302 allows the client to perform a lookup function (i.e., which only tests whether a range is fully present in the AC), to read a range (i.e., which tests whether a range is fully present in the AC and, if it is, reads it into RAM), to invalidate/evict a range (which can only be done in units of AC pages), to populate/write a range (which adds new data to the AC, and can only be done in units of AC pages), and overwrite data in the AC (which does not have to be done in units of AC pages, e.g., it may overwrite any subranges of a given range that are already in the AC with the given new data but not add any subranges that are not already in the AC to the AC—that makes it possible for it to be called on arbitrary ranges, not only on units of AC pages, and is therefore suitable for the general write path).

The initialization interface 304 allows the client to add a disk (if it is a cache disk being added, then this may add the disk to a AC, or create a new AC if none exists yet), remove a disk (if the removed disk belongs to a AC, then that AC will be reconfigured such that it may continue to operate on the remaining cache disks—when only one SSD drive provides storage for the AC, that will mean deleting the AC, since there will be no remaining cache disks), load the AC (during pack load—will obtain list of logical cache disks from the disk pack manager; if there are cache disks in the pack but there is no AC yet, then the AC will be created on the cache disk(s)), unload (during pack unload), suspend the AC (e.g., for use during system suspend), and resume the AC (e.g., for use during system resume following system suspend).

The administrative interface 306 allows the client to reinitialize the AC (i.e., clear existing cache and recreate it, e.g., in response to a detected error condition), check metadata consistency, dump statistics, dump diagnostics, and perform other administrative functions.

Figure 4:
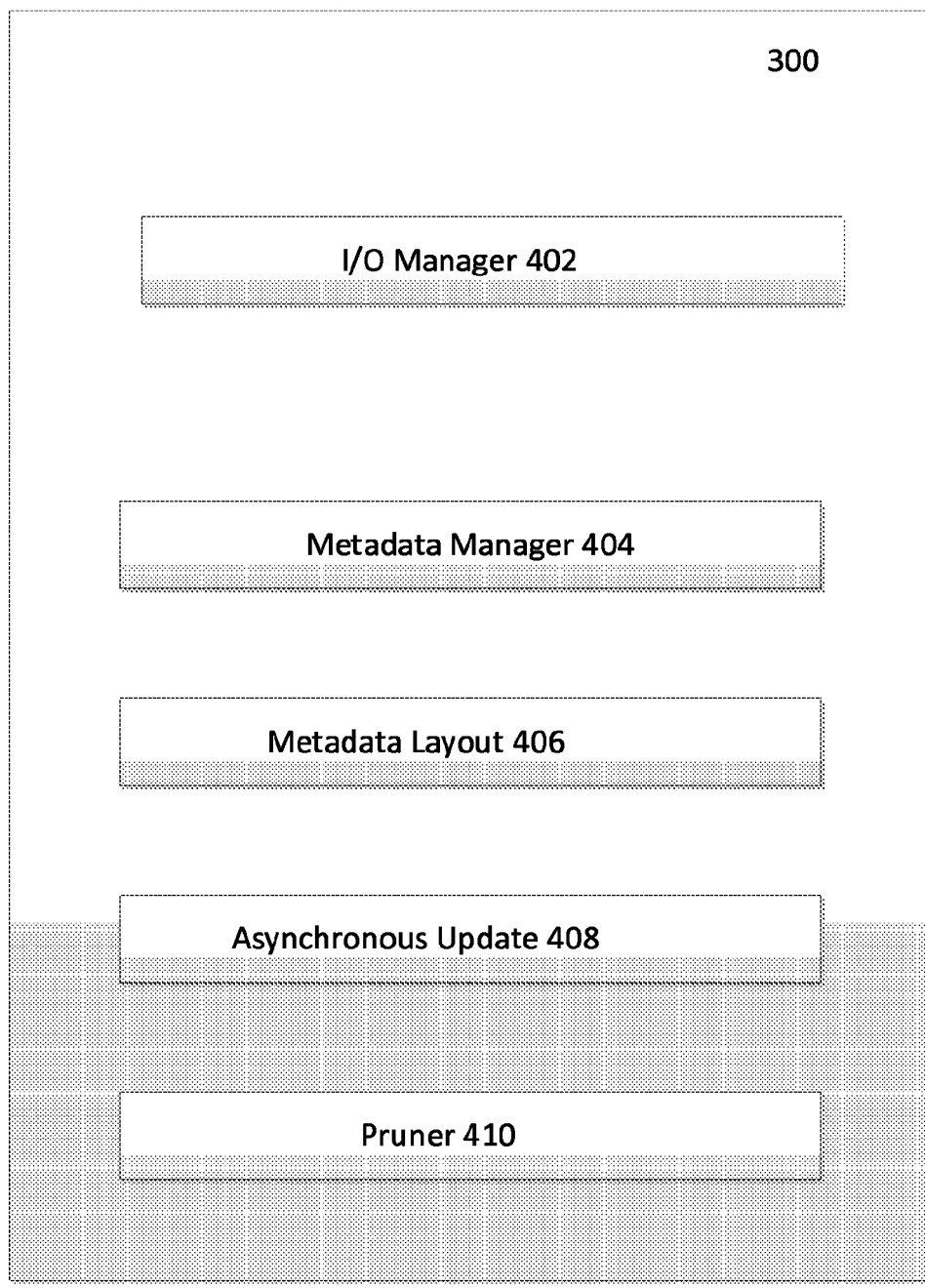
FIG. 4 is a schematic block diagram showing relevant sub-modules of the AC module, in accordance with one exemplary embodiment.

FIG. 4 is a schematic block diagram showing relevant sub-modules of the AC module 300, in accordance with one exemplary embodiment. Among other things, the AC module 300 includes an I/O manager sub-module 402, a metadata manager sub-module 404, a metadata layout sub-module 406, an asynchronous update sub-module 408, and a pruner sub-module 410.

The I/O manager sub-module 402 handles reads and writes from and to the region manager and region metadata tracker components of the storage processor.

The metadata manager sub-module 404 caches the AC's own metadata. If the amount of metadata is small enough to fit into RAM, then this sub-module may simply load all of the metadata into RAM when the cache is created or loaded and keep it there, writing through it whenever the metadata are modified. Alternatively, this sub-module may provide for paging the AC's metadata, allowing the metadata to be much larger (for example, to support much larger virtual address spaces, and thus, in particular, HLBA spaces).

The metadata layout sub-module 406 handles various metadata formatting for metadata structures described below, such as, for example, keeping track of pack-level metadata (e.g., which AC types exist and which logical disks each existing AC type resides on), handling the layout of the root metadata region of which each AC type has one on each disk on which it resides and through which all other metadata and user data are directly or indirectly found, handling the layout of the bitmap structures which track which parts of the regions allocated to the AC currently contain valid data, and handling the layout of the page tables that comprise the AC's index, mapping virtual addresses to physical addresses.

The asynchronous update sub-module 408 provides a background task that periodically updates the on-disk structures with those metadata changes which are made asynchronously. For example, the "read heat" of user data AC pages may be tracked in-core, and this sub-module may periodically write updates from the in-core counters to bits representing "heat" within page table entries.

The pruner sub-module 410 provides a background task that evicts data from the AC based on a predetermined heuristic policy. It will be possible (and at times necessary) to evict data synchronously in response to write (populate) and invalidate calls. Embodiments also may provide for asynchronously pruning data from the AC, e.g., to make room in advance for future write calls. This sub-module may be configured to issue TRIM commands, e.g., for blocks freed by its own evictions and/or for blocks freed by calls to the "invalidate" AC module interface (which might place blocks to be trimmed on an in-core list for the pruner to act on later—although this may be done synchronously).

AC Module Metadata

Figure 5:
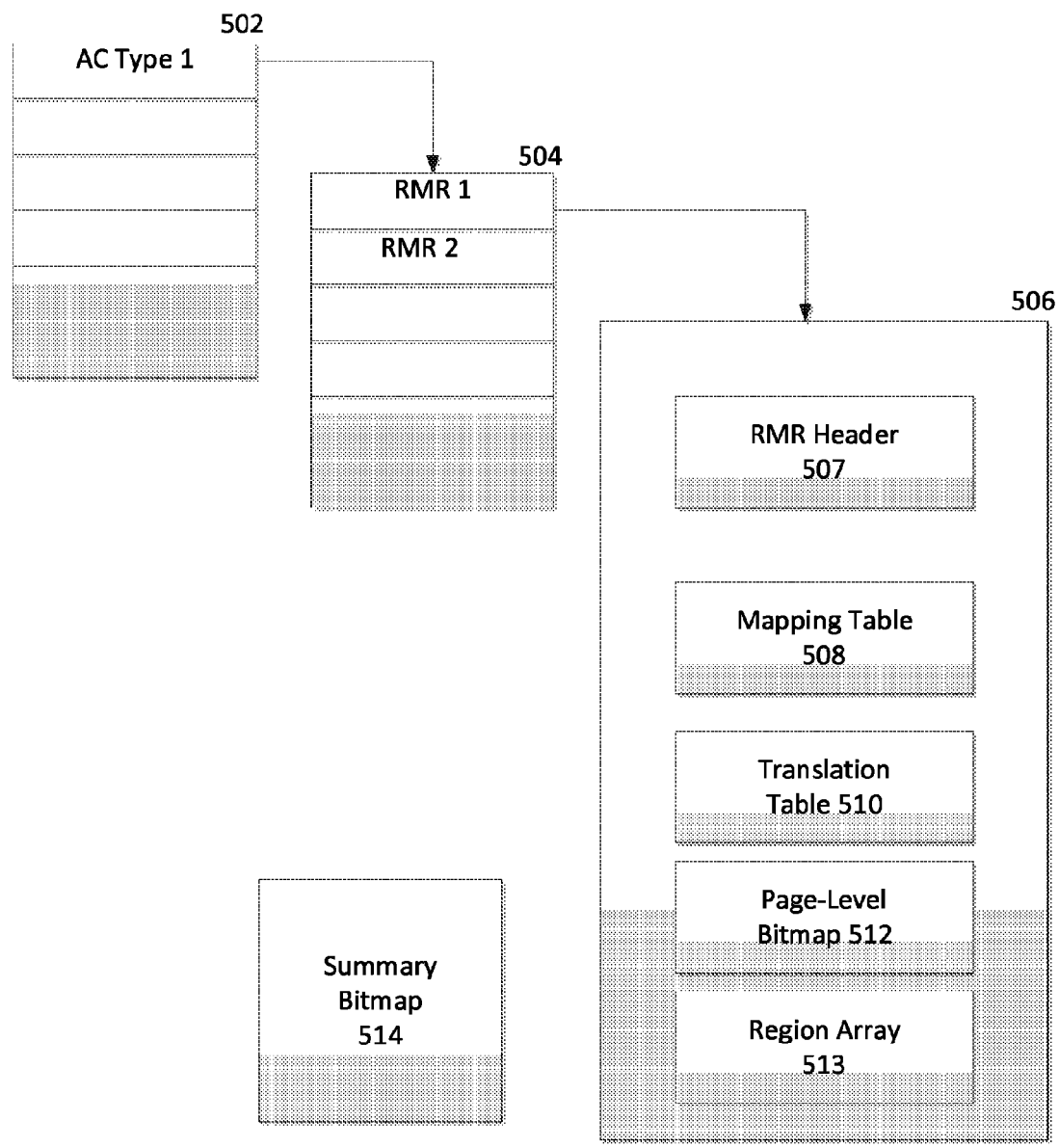
FIG. 5 is a schematic diagram depicting some of the metadata structures used by the AC module, in accordance with one exemplary embodiment.

FIG. 5 is a schematic diagram depicting some of the metadata structures used by the AC module, in accordance with one exemplary embodiment.

The top-level metadata (maintained at the disk pack level) includes metadata version information, a checksum, and an array 502 with one entry for each possible type of AC in a given implementation, in which each entry contains a further array 504 mapping the logical disk(s) on which the AC of that type resides (if any) to the root metadata region (RMR) for that AC type on that logical disk.

Each AC will have an RMR 506 on each logical disk across which it is spread. For example, an AC residing on only one logical disk will have only one RMR, and AC residing on two logical disks will have two RMRs, etc. The RMR 506 contains a header 507 at a fixed offset and of a fixed size, which describes (in addition to checksums and version information) the locations of the other metadata contained within the RMR.

Those other metadata include an array 508 mapping the large, fixed-size chunks of that AC's virtual space to the (LUN, Logical Offset) pairs that correspond to those chunks of the AC's virtual space. This mapping will be loaded into core when the cache is loaded, and will be used during operation to compute, from a Set (LUN) and Logical Offset (e.g., HLBA), the corresponding AC virtual address to use to index into the AC's page tables. The Set/Offset pair that the client uses is a logical address, so this mapping provides a logical to virtual translation. Another piece of metadata in the RMR is an array 510 of root page table entries, where each entry points to a page table page (the other page table pages do not reside in the RMR, but in other regions belonging to the AC). The page tables translate AC virtual addresses to AC physical addresses.

Another piece of metadata in the RMR is a region array 513, which keeps track of which regions on the disk are allocated to the AC, and maps from the AC's flat physical address space to the region addresses used for I/O to the region manager and region metadata tracker of the storage processor.

Another piece of metadata in the RMR is a page-level bitmap 512. The regions allocated to the AC other than the RMR will be divided into units of "AC pages" of a predetermined size (e.g., 2 MB). The persistent page-level bitmap 512 (residing in the RMR) comprises an array of one bit per AC page and is used to track which physical AC pages are in use.

Figure 6:
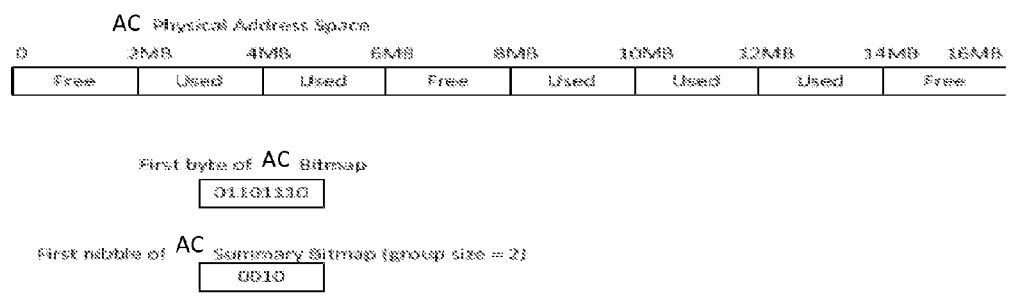
FIG. 6 schematically shows an exemplary page-level bitmap entry and a summary bitmap entry, in accordance with one exemplary storage scenario.

A summary bitmap 514 comprising an array of one bit per bitmap group (a predetermined number of bitmap bits is allocated in-core to track which bitmap groups are full (containing all 1 bits, representing allocated AC pages), thus speeding up allocations, particularly when the AC is very full. In this exemplary embodiment, the summary bitmap is not stored persistently but instead is computed from the on-disk bitmap when the cache is loaded. For example, consider a system with 64 GB of AC user data space divided into 32K AC user pages of 2 MB per page. The page-level bitmap would be 32 Kbits or 4 KB. Assuming a bitmap group size of 64 bits, there would be 512 bitmap groups, so the summary bitmap would only be 512 bits (64 bytes) long, and is computed from the 4 KB persistent bitmap when the AC is loaded. FIG. 6 schematically shows an exemplary page-level bitmap entry and a summary bitmap entry for the first 16 MB of a physical address space, with a 2 MB AC page size and a bitmap group size of two, after some pages have been allocated.

Additionally, an index will operate at a granularity of AC pages—it will map virtual AC pages to physical AC pages—and will comprise a multi-level page table structure, which is a tree of pages, each consisting of an array of page table entries, with the root page being responsible for the entire virtual address space, and each entry within a page being responsible for a fixed fraction of the virtual address space for which the whole page is responsible, the fraction being the reciprocal of the number of entries in the page. The "root page" is an array within the RMR, while other pages are allocated from other regions belonging to the AC. Each entry points to a page that is responsible for the same part of the virtual address space as the entry that points to it. The lowest-level page table entries point to physical AC pages (which contain AC user data), and higher-level page table entries ("page directory entries") point to lower-level page table pages. Each page table entry contains some bits representing a pointer to another page table page or to a physical AC page and also contains other bits used for various forms of control, such as valid bits and measurements of "heat." In certain alternative embodiments in which the page tables are entirely preallocated such that the locations of the page table pages themselves are fixed, pointers within the page directory entries may be unnecessary. However, the pointers in the lowest-level page table entries are needed because their ability to change provides the virtualization—the ability to cache different sets of virtual pages in different physical places at different times. It should be noted that other types of structures may be used in lieu of a page table structure (e.g., a B+-tree).

As an example, to support a virtual address space of 16 TB with 8-byte pointers to 2 MB physical AC pages, the lowest-level page tables (which are the dominant part of the size of the AC metadata) would take up (16 TB/2 MB)*8 bytes=64 MB, which in this exemplary embodiment is small enough to preallocate from the AC's solid-state storage and keep cached in RAM throughout operation. If page table pages are also 2 MB, then the 64 MB of lowest-level page tables would be divided into 32 pages, requiring 32 page directory entries to map. Those page directory entries would be stored in the first 32 entries of the array of root page table entries in the RMR. Each 2 MB page table page would then map 256K user pages (each 2 MB), so each page table page would indirectly map 512 GB of virtual space. The 16 TB of total virtual space offered by the AC would be redistributed among Sets as they were created and deleted, making use of the array in the pack-level metadata, which would map large (for example, 1 TB) chunks of virtual space to (Set, LBA offset) pairs. In-core, when the cache is loaded and whenever a LUN is created or deleted, that array would be translated into a Set-indexed array of LBA-chunk-indexed arrays of virtual addresses, for rapid translation of (Set, LBA offset) to AC virtual address. That would allow, for example, the 16 TB of supported virtual space first all to be allocated to one Set, then that Set to be deleted and four 4 TB Sets to be created, then one of those to be deleted and two 2 TB Sets to be created in its place, and so forth. A Set that was not an integral multiple of 1 TB (using that as an example virtual address space chunk size) in length would waste some virtual space by consuming an integral multiple of 1 TB of virtual space. In certain embodiments, the LUN length may be a user-configurable parameter.

Figure 7:
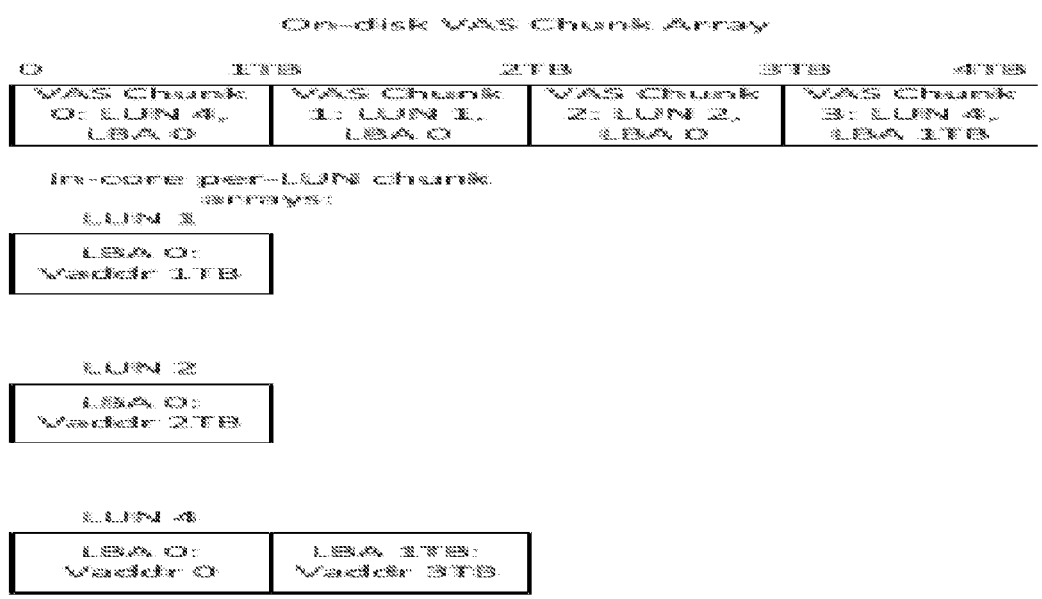
FIG. 7 schematically shows how the on-disk array mapping the AC's virtual address space chunks to (LUN, LBA) pairs, and the in-core arrays for each LUN that would be generated from the on-disk array, might look in accordance with one exemplary storage scenario.

Consider, for example, an AC that supports 4 TB of virtual space divided among LUNs in 1 TB chunks, where four LUNs (LUNS 0-3) of 1 TB each were created, then LUNs 0 and 3 were deleted, and then LUN 4 of 2 TB in length was created. FIG. 7 shows how the on-disk array mapping the AC's virtual address space (VAS) chunks to (LUN, LBA) pairs, and the in-core arrays for each LUN that would be generated from the on-disk array, might then look.

Figure 8:
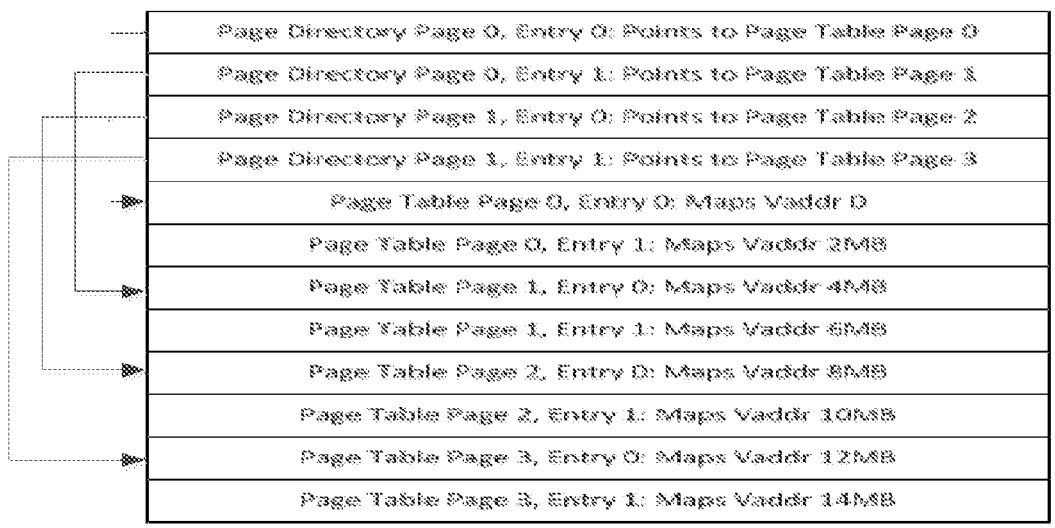
FIG. 8 shows how the physical AC space allocated for page tables, in the AC's physical address space, might look in accordance with one exemplary storage scenario.

The in-core per-LUN chunk arrays allow for the quick conversion of (LUN, LBA) pairs to AC virtual addresses (each AC has one such array per LUN). Next, the page directories and page tables convert AC virtual addresses to AC physical addresses. To illustrate this, consider an AC in which page directory pages and page table pages can only hold two entries each, and we only have two page directory pages, so that we have a total of four page directory entries, four low-level page table pages, and eight low-level page table entries, mapping a total of 16 MB of virtual space. FIG. 8 shows how the physical AC space allocated for page tables, in the AC's physical address space, might then look.

Note that the low-level page table entries, which map the virtual addresses, may in some cases indicate that the virtual address is "not present" (meaning no data are cached in the AC for that virtual address). Entries that are marked present contain the offset (in units of AC pages) into the AC physical address space of the cached data for that virtual address.

While certain implementations may provide for only one AC, as discussed above, certain embodiments may allow for multiple ACs of different types. Thus, for example, in this exemplary embodiment, ACs may be provided for the HLBAT, ZMDT, and/or other data, in which case there would be one RMR for the HLBAT AC (on each logical disk across which the HLBAT AC is spread), one RMR (per logical disk) for the ZMDT AC, and so on. It should be noted that each AC is independent. However, each AC will be a unified cache for data of its type across all Sets (LUNs), i.e., there will not be a separate AC for each Set. In particular, a system manager component of the storage processor will decide how to divide the available solid-state storage among ACs of each type and optionally also to the primary storage (e.g., redundant storage), but within a given AC, how much data from each different Set will be cached in that AC will vary with time, depending on access patterns and heuristics (and, of course, the creation and deletion of Sets).

Integration of AC Module

In this exemplary embodiment, when the AC read routine is called (e.g., upon an HLBAT L1 read miss or read-ahead), if the AC has all the data, the AC will perform the read from the cache (e.g., into the L1). Otherwise, the AC will return a miss, and the read worker will proceed to process the read as it would have if no AC were present, e.g., causing a read to primary storage. It should be noted that, in this exemplary embodiment, a partial hit will return a miss, although alternative embodiments may provide for splitting up reads between the AC and the primary storage.

In this exemplary embodiment, when a write is processed (e.g., a host write request or a replay from the J1), the AC overwrite routine may be called for the range being written before submitting the back-end write to update persistent storage. A write lock mechanism is provided to ensure that order data is written into the AC and the order that corresponding data is written to primary storage is consistent, e.g., if data A is written to a particular range of the AC and then data B is written to the same range of the AC, the locking mechanism ensures that data B cannot be written to primary storage before data A. This order of operations should allow the contents of the AC for a given range to be protected in the same way (by the same locks) as the contents of the redundant storage for the same range. The overwrite will not allocate new space to the AC, but it will update any data that are already cached in the AC within the given range, thus ensuring that the AC and the back-end storage remain coherent.

In this exemplary embodiment, the J2 will flush all disks, including logical disks used for ACs, during a flush cycle. This will happen automatically as long as the J2 is aware of the existence of the logical disk(s) on which the AC resides. This is necessary because the AC will use the J2 to journal its metadata and thereby keep them crash-consistent.

In this exemplary embodiment, when an HLBA range is freed, the AC for that range will be invalidated, although in alternative embodiments it may be acceptable to leave the AC range intact and return stale data, e.g., if the host read from a range it had freed.

In this exemplary embodiment, a background task will call the AC populate (write) routine on those cached HLBA ranges it selects for acceleration based on a predetermined heuristic. For example, HLBA ranges may be chosen from the ZMDT's prefer-retain list, which contains the CLT ranges (which refer directly to HLBA ranges) of the most recent transactional reads and writes. Alternatively, HLBA ranges may be chosen based on one or more previous AC read misses into the same AC page. The background task will protect the AC user data with the same type of locking mechanism discussed above.

In this exemplary embodiment, when a disk pack contains an SSD drive in the dedicated SSD slot, the AC load-pack routine may be called to load one or more ACs from the SSD (e.g., if portions of the SSD contain AC data) or to create one or more ACs (e.g., if no AC exists yet). If a new SSD drive that has not been absorbed in the disk pack is detected, the AC's add-disk routine may be called to add portion(s) of the SSD storage space to one or more ACs.

In this exemplary embodiment, when the storage processor detects that a logical disk has gone away, the AC remove-disk routine may be called, in which case the AC module will check whether the disk that has gone away belonged to any AC(s), and, if so, will reconfigure those ACs on any remaining cache disks so that they may continue to operate.

In this exemplary embodiment, when the RTP is unloaded, it will call the AC unload routine.

In this exemplary embodiment, if an I/O error occurs on a write to an AC, the AC module will call its reinitialize method internally, to ensure that stale data do not survive. If a cache disk cannot be reinitialized, it will be removed from the AC entirely. In an alternative exemplary embodiment, the AC page encapsulating the error may be taken off-line, allowing the remainder of the AC to continue to operate with the already cached data.

In this exemplary embodiment, the AC module also will be integrated with other components of the storage processor, such as for diagnostics (e.g., checking the consistency of the AC and correcting it if needed) and analytics.

In this exemplary embodiment, the crash-consistency of the AC metadata is kept separate from the crash-consistency of the virtualization and redundancy metadata for the primary storage. In particular, any J2 transaction contains either only AC-cache metadata blocks or only redundant-storage-metadata blocks, not a mix of both. More generally, no metadata structures kept on logical disks that are part of redundancy groups contain information about AC structures. Other than the pack-level structure that holds the pack-level AC structures, such metadata structures do not contain any references to logical disks that are part of ACs. For example, nothing in the metadata of the CAT Manager, Cluster Manager, Zone Manager, and other components of the storage manager maintains any reference to AC bitmaps or AC page tables or what data the AC has cached.

In this exemplary embodiment, for cache-coherency purposes, the AC data are a peer of the redundant virtualized data (the data stored in the back-end disks), where the L1 cache effectively serves as a coherency point for both. Thus, as discussed above, the locking of an AC's user data should follow the same scheme as the locking of its redundant user data. For example, the writes to the AC (e.g., based on the ZMDT prefer-retain list) will lock the range in essentially the same way that ranges are locked when the AC invalidate routine is called.

In this exemplary embodiment, the AC's on-disk format will support the use of small 4K pages as well as of large 2 MB pages, e.g., to provide for both to caching user data in smaller chunks if that turns out to be useful and extending page tables dynamically with 4K pages instead of always having to allocate 2 MB page table pages.

Figure 9:
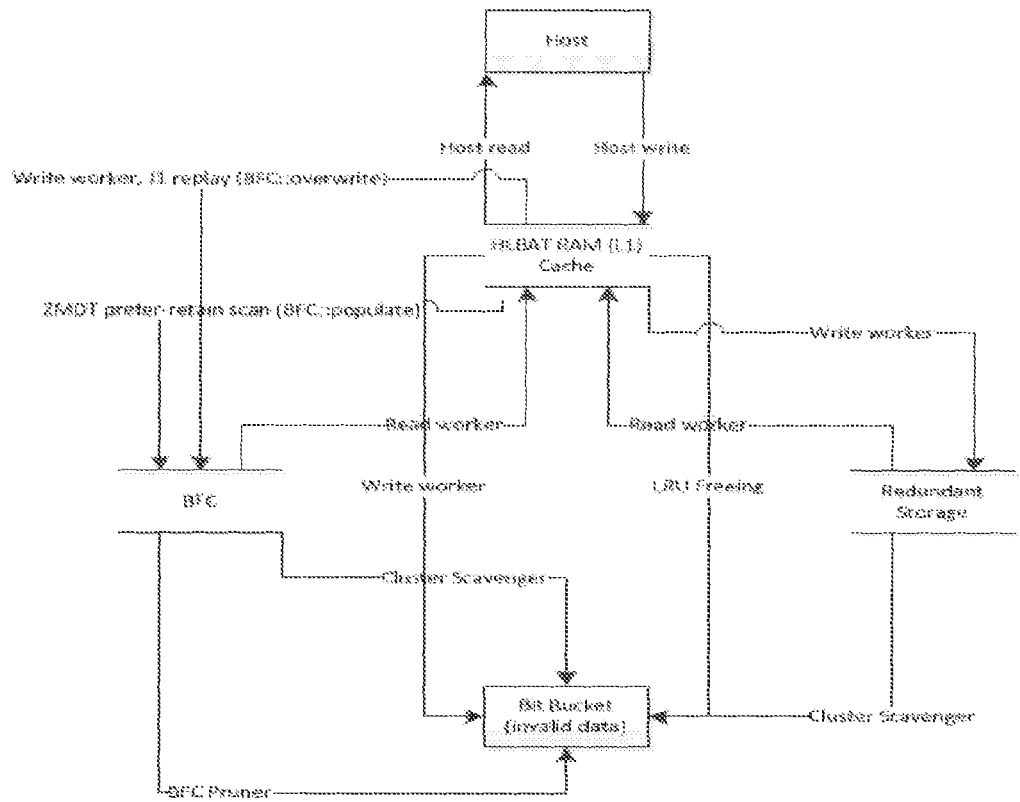
FIG. 9 is a schematic diagram of exemplary data flows for the AC module, in accordance with one exemplary embodiment.

FIG. 9 is a schematic diagram of exemplary data flows for the AC module, in accordance with one exemplary embodiment. User data enter the AC through the calls to the populate (write) routine from the background task that examines the ZMDT prefer-retain list or any other database containing candidate HLBAT ranges to be populated, are read from the AC by a read worker when it checks for and gets a (complete) AC hit before going to the back-end storage to do a read, are updated by write workers and J1 replay, and are invalidated by background pruning and the Cluster Scavenger.

The following table summarizes some of the external system dependencies that the AC depends on to complete some or all of its tasks, in accordance with this exemplary embodiment:

| External System | Dependencies on that System |
| --- | --- |
| Region Manager | The raw storage space (regions) the AC will use for its metadata and user data, and the I/O interfaces the AC will use for user data I/O. |
| RegionMetaDataTracker | AC metadata I/O (using the J2 requires the use of a CacheRangeTracker). |
| J2 | Transactions (using an NVRAM log), which the AC will use to ensure the atomicity of its operations. |
| System Manager | Notifications of events, such as startup, shutdown, disk insert, disk remove. |
| Disk Pack Manager | The list of logical disks available for use by the AC. |
| Error Policy Module | Handlers for errors detected by the AC, particularly I/O errors on the mSATA. |
| Cache Manager | Coherency point for both the AC's user data and the redundant user data, of which the AC's user data are peers: clients of both rely on the Cache Manager to provide the L1 cache as a coherency point, and lock their AC data and their redundant user data similarly. The AC might also rely on Cache Manager to page its own metadata, particularly its page tables, or handle sparse tables, as discussed below. |
| Dispatcher | The AC's clients (albeit not the AC directly) will use worker thread contexts to perform I/O to and from the AC. |
| J1 | Coherency point for both the AC's user data and the redundant user data - clients rely on the J1 replay being aware of the need to invalidate or write to the AC just as it writes to the redundant user data. |
| Cluster Scavenger | Freeing space in the AC by invalidating freed HLBA ranges. |
| ZMDT Prefer-Retain Scan | Populate the HLBA AC based on heuristics. |
| LockObject.cpp | AC's internal locking (such as on page table pages) |

Population of AC Based on ZMDT

As discussed above, in one exemplary embodiment, the AC is populated from the ZMDT prefer-retain LRU list, which is a least recently used list of translations used by the zone metadata tracker (ZMDT) of the storage processor for transactional I/O. This can be done as follows. First, starting at the least recently used end of the list, an individual ZMDT list element is translated into a corresponding element used by the host logical block address tracker (HLBAT). Then, the corresponding AC user page entry is checked for existence in the AC. If it already exists, it is skipped; otherwise, it is added to the AC. Adding an entry to the AC may cause some other entry to be discarded. The entry to be discarded is chosen based on a predetermined policy, e.g., on an LRU basis, or a random choice may be made. A random choice policy approximates an LRU choice policy if the AC is populated in an LRU to MRU order, as less recently used entries have a higher chance of selection as they have more chances to be selected.

In one exemplary embodiment, such a population algorithm relies on the fact that a ZMDT snapshot mechanism of the storage processor maintains a data structure computed from the ZMDT prefer-retain list, specifically a snapshot mechanism as described in U.S. patent application Ser. No. 13/790,163, which is hereby incorporated herein by reference in its entirety. The AC populator uses this data structure under the ZMDT snapshot lock. The data structure comprises an array of elements, each with a zone number and a starting offset and length within the zone. Up to 256K of the most recently used entries is maintained by the ZMDT snapshot mechanism. An entry in the ZMDT snapshot data structure may start on any sector boundary and be any number of sectors in length; however, an AC entry must start on a boundary that is a multiple of AC user pages in length and must be an AC user page in length.

In one exemplary embodiment, population of the AC takes place whenever the ZMDT snapshot code creates or restores a ZMDT snapshot. Snapshots are created periodically (e.g., once an hour starting one hour after system initialization if the host has generated I/O in the past hour). Restoring a snapshot occurs at system initialization.

A ZMDT snapshot entry may be converted to an AC entry as follows. A CATM Table of the storage processor maps from a <LUN,HLBA> tuple to a ZMDT Zone and offset. A reverse mapping can be used to populate the AC. This may be computed stepwise, as follows. First, the process scans through the LUNs and zones per LUN in the CATM Table to match the ZMDT zone. If the zone is found, then the LUN that contains the Zone, and the ZMDT offset within the zone, can be determined. The HLBA is computed from the ZMDT zone and offset. For example, if it is determined that the second zone associated with LUN #0 matches the zone from the ZMDT, then it is known that the LUN is #0 and that the HLBA is in the range covered by the second zone.

The cost of computing the reverse lookup could be substantial if done, for example, with a sequential search through the CATM Table, as the computation is performed once per element in the ZMDT prefer-retain LRU list. Instead, prior to converting the list of ZMDT elements, a lookup table sorted by zone number that maps to an entry containing the LUN number and CAT zone number is created. Then, a binary search is performed for each ZMDT element.

In order to insert an entry into the AC, once an AC element is known, its HLBA is rounded to the nearest AC user page-sized and -aligned object. A lookup is performed in the AC to determine whether the object is already cached. If the lookup fails, the object is then populated in the AC; otherwise, it is skipped.

SOME ALTERNATIVE EMBODIMENTS

In various alternative embodiments, the storage processor may provide, for each LUN, an extra share, writing to which would not only write data to that LUN, but also populate the AC with that data immediately. This would allow, for example, users to specify that particular data sets be kept on an AC.

In a further alternative embodiment, the AC may track the number of read misses per AC page and add HLBAs to a database to be used to drive AC population at a later time. Each HLBA range may be added to the population database after a single miss or multiple misses per AC page. The threshold number of misses for an AC page to become a population candidate may be pre-configured or dynamically computed based on heuristics capable of evaluating the effectiveness of the current policy in real-time.

Conceivably, even in a redundant storage system such as the Drobo™ appliance, some combinations of failures and disk removals could lead to a particular piece of data in the AC being the only copy of that data remaining in the system. Various alternative embodiments may provide for the rebuilding of data in the primary storage based on such a copy of the data in the AC.

Various alternative embodiments may provide for paging of the page table pages, e.g., to support larger virtual spaces, since their space consumption grows linearly with the supported virtual address space size. Additionally or alternatively, various alternative embodiments may provide for support of sparsely allocated page tables in order to support even larger virtual spaces, e.g., using "a present/not present" bit in the page table and page directory entries.

While exemplary embodiments described above do not always check the AC upon a read miss in the L1 cache, various alternative embodiments may automatically look in the AC in the context of an L1 miss.

In various alternative embodiments, some kinds of AC errors may be handled less drastically than reinitializing or disabling the cache. For example, if there is a write error on a AC page while trying to populate the cache, the page could be marked as allocated but not mapped by any page table entries, thus avoiding that particular page but continuing to use the rest of the cache.

MISCELLANEOUS

It should be noted that headings are used above for convenience and are not to be construed as limiting the present invention in any way.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that terms such as "file server," "storage array," and "computer" may be used herein to describe devices that may be used in certain embodiments of the present invention and should not be construed to limit the present invention to any particular device type unless the context otherwise requires. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of managing an accelerator cache by a storage processor in a data storage system, the method comprising:
    detecting presence of an accelerator cache storage device in the data storage system;
    using a first portion of storage space from the detected accelerator cache storage device for an accelerator cache;
    using a second portion of storage space from the detected accelerator cache storage device for a physical storage tier, wherein the detected accelerator cache storage device is used for both the accelerator cache and the physical storage tier;
    determining that additional storage space is needed in the physical storage tier;
    removing storage space from the accelerator cache; and
    adding the storage space removed from the accelerator cache to the physical storage tier to increase the size of the physical storage tier.

2. A method according to claim 1, wherein detecting the presence of the accelerator cache storage device comprises:
    detecting the presence of the accelerator cache storage device in a dedicated slot of the data storage system.

3. A method according to claim 1, wherein using a first portion of storage space from the detected accelerator cache storage device for an accelerator cache comprises:
    adding the first portion of storage space from the detected accelerator cache storage device to an existing accelerator cache that includes storage space from at least one other accelerator cache storage device.

4. A method according to claim 1, wherein the accelerator cache is non-redundant storage, and wherein the physical storage tier is redundant storage.

5. A method according to claim 1, wherein the physical storage tier comprises a redundant storage tier using the second portion of storage space from the detected accelerator cache storage device and using storage space from at least one primary storage device that is not used for the accelerator cache.

6. A method according to claim 1, wherein the physical storage tier comprises a redundant storage tier using the second portion of storage space from the detected accelerator cache storage device and using storage space from at least one other accelerator cache storage device that is used for the accelerator cache.

7. A method according to claim 1, further comprising:
    storing a portion of user data in the accelerator cache; and
    storing the portion of user data redundantly in the physical storage tier.

8. A method according to claim 1, wherein detecting the presence of the accelerator cache storage device comprises:
    detecting the presence of the accelerator cache storage device in a general-purpose slot of the data storage system.

9. A method according to claim 1, wherein determining that additional storage space is needed in the physical storage tier comprises:
    determining that additional storage space is needed in the physical storage tier to maintain redundant storage of user data when other storage resources are not available.

10. A method according to claim 1, further comprising:
    detecting removal of the accelerator cache storage device; and
    reconfiguring at least one of the accelerator cache or the physical storage tier.

11. A data storage system comprising:
    a storage processor; and
    at least one storage slot allowing insertion of an accelerator cache storage device, wherein the storage processor is configured to detect presence of an accelerator cache storage device in the data storage system, use a first portion of storage space from the detected accelerator cache storage device for an accelerator cache, use a second portion of storage space from the detected accelerator cache storage device for a physical storage tier, wherein the detected accelerator cache storage device is used for both the accelerator cache and the physical storage tier, determine that additional storage space is needed in the physical storage tier, remove storage space from the accelerator cache, and add the storage space removed from the accelerator cache to the physical storage tier to increase the size of the physical storage tier.

12. A system according to claim 11, wherein detecting the presence of the accelerator cache storage device comprises:
    detecting the presence of the accelerator cache storage device in a dedicated slot of the data storage system.

13. A system according to claim 11, wherein using a first portion of storage space from the detected accelerator cache storage device for an accelerator cache comprises:
    adding the first portion of storage space from the detected accelerator cache storage device to an existing accelerator cache that includes storage space from at least one other accelerator cache storage device.

14. A system according to claim 11, wherein the accelerator cache is non-redundant storage, and wherein the physical storage tier is redundant storage.

15. A system according to claim 11, wherein the physical storage tier comprises a redundant storage tier using the second portion of storage space from the detected accelerator cache storage device and using storage space from at least one primary storage device that is not used for the accelerator cache.

16. A system according to claim 11, wherein the physical storage tier comprises a redundant storage tier using the second portion of storage space from the detected accelerator cache storage device and using storage space from at least one other accelerator cache storage device that is used for the accelerator cache.

17. A system according to claim 11, wherein the storage processor is further configured to store a portion of user data in the accelerator cache and to store the portion of user data redundantly in the physical storage tier.

18. A system according to claim 11, wherein detecting the presence of the accelerator cache storage device comprises detecting the presence of the accelerator cache storage device in a general-purpose slot of the data storage system.

19. A system according to claim 11, wherein determining that additional storage space is needed in the physical storage tier comprises:

determining that additional storage space is needed in the physical storage tier to maintain redundant storage of user data when other storage resources are not available.

20. A system according to claim 11, wherein the storage processor is further configured to detect removal of the accelerator cache storage device and to reconfigure at least one of the accelerator cache or the physical storage tier.

* * * * *